US009203453B2

(12) United States Patent
Farrell et al.

(10) Patent No.: US 9,203,453 B2
(45) Date of Patent: Dec. 1, 2015

(54) RECEIVER WITH ANTENNA SWITCHING CAPABILITY

(75) Inventors: Brian Farrell, Troy, MI (US); Jean-Christophe Deniau, Fenton, MI (US); John R. Costello, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 555 days.

(21) Appl. No.: 13/114,604

(22) Filed: May 24, 2011

(65) Prior Publication Data

US 2012/0302191 A1 Nov. 29, 2012

(51) Int. Cl.
| H04B 1/06 | (2006.01) |
| H04B 7/00 | (2006.01) |
| H04B 1/16 | (2006.01) |
| B60C 23/04 | (2006.01) |
| H04B 7/08 | (2006.01) |
| H04L 12/40 | (2006.01) |

(52) U.S. Cl.
CPC .......... *H04B 1/1607* (2013.01); *B60C 23/0444* (2013.01); *B60C 23/0454* (2013.01); *H04B 7/0808* (2013.01); *H04L 12/40039* (2013.01); *H04L 2012/40273* (2013.01)

(58) Field of Classification Search
USPC ........... 455/132–141, 269–294, 343.1–343.6, 455/574, 345
See application file for complete search history.

(56) References Cited

U.S. PATENT DOCUMENTS

| 4,823,398 | A | * | 4/1989 | Hashimoto | .................... 455/134 |
| 5,566,364 | A | * | 10/1996 | Mizoguchi et al. | ........... 455/132 |
| 5,722,089 | A | * | 2/1998 | Murakami | .................. 455/575.7 |
| 6,622,552 | B1 | | 9/2003 | Delaporte | |
| 6,861,942 | B1 | | 3/2005 | Knapp et al. | |
| 7,026,953 | B2 | * | 4/2006 | Fujii | ......................... 340/870.16 |
| 7,570,209 | B2 | * | 8/2009 | Shi et al. | ........................ 342/372 |
| 7,574,192 | B2 | * | 8/2009 | Gudmundsson | ........... 455/343.4 |
| 7,659,812 | B2 | * | 2/2010 | Yegin et al. | ..................... 340/447 |
| 7,734,269 | B2 | * | 6/2010 | Komulainen et al. | ...... 455/277.2 |
| 8,155,712 | B2 | * | 4/2012 | Gilb et al. | ...................... 455/574 |
| 8,441,913 | B2 | * | 5/2013 | Li et al. | ......................... 370/208 |
| 2003/0156069 | A1 | * | 8/2003 | Ooe et al. | ...................... 343/713 |
| 2004/0058690 | A1 | * | 3/2004 | Ratzel et al. | ............... 455/456.1 |
| 2004/0198229 | A1 | | 10/2004 | Hirata | |
| 2004/0203550 | A1 | * | 10/2004 | Xu | ............................. 455/277.1 |
| 2005/0197080 | A1 | * | 9/2005 | Ulupinar et al. | .............. 455/135 |
| 2006/0068854 | A1 | * | 3/2006 | Sandhu | ......................... 455/574 |
| 2007/0111690 | A1 | * | 5/2007 | Nagy | ......................... 455/193.1 |
| 2009/0042529 | A1 | * | 2/2009 | Lindenmeier et al. | ..... 455/277.2 |

(Continued)

FOREIGN PATENT DOCUMENTS

| CN | 101536357 A | 9/2009 |
| WO | 2006099079 A3 | 9/2006 |

OTHER PUBLICATIONS

International Search Report and Written Opinion dated Aug. 14, 2012, from corresponding International Patent Application No. PCT/US2012/038650.

*Primary Examiner* — Edward Urban
*Assistant Examiner* — Rui Hu

(57) ABSTRACT

A system and method for receiving signals using a receiver with antenna switching capability is provided. The receiver is configured to poll each antenna of the plurality of antennas and process the signals from each antenna. In addition, the receiver coordinates providing power to each antenna with the polling.

23 Claims, 3 Drawing Sheets

(56) References Cited

U.S. PATENT DOCUMENTS

| | | |
|---|---|---|
| 2009/0075617 A1* | 3/2009 | Walker et al. .............. 455/277.1 |
| 2009/0207079 A1* | 8/2009 | Samukawa et al. ........... 342/378 |
| 2009/0243923 A1 | 10/2009 | Heraud et al. |
| 2010/0245039 A1* | 9/2010 | Tokunaga .................... 340/5.61 |
| 2011/0148578 A1* | 6/2011 | Aloi et al. ...................... 340/8.1 |
| 2012/0214434 A1* | 8/2012 | Otaka et al. ................... 455/141 |
| 2012/0302191 A1* | 11/2012 | Farrell et al. .................. 455/272 |

* cited by examiner

RECEIVER WITH ANTENNA SWITCHING CAPABILITY

FIELD OF THE INVENTION

The present disclosure generally relates to a receiver with antenna switching capability.

BACKGROUND

Controlling power usage is becoming increasingly important especially in vehicle applications. As such, radio frequency receivers have been developed that can enter a sleep mode and autonomously wake-up and poll to RF signals. However, these systems do not address antennas that require power when receiving signals.

SUMMARY

A system and method for receiving signals using a receiver with antenna switching capability is provided. The receiver is configured to poll each antenna of a plurality of antennas and process the signals from each antenna. In addition, the receiver coordinates providing power to each antenna with the polling.

DRAWINGS

In order that the disclosure may be well understood, there will now be described various implementations thereof, given by way of example, reference being made to the accompanying drawings, in which.

DETAILED DESCRIPTION

Figure 1:
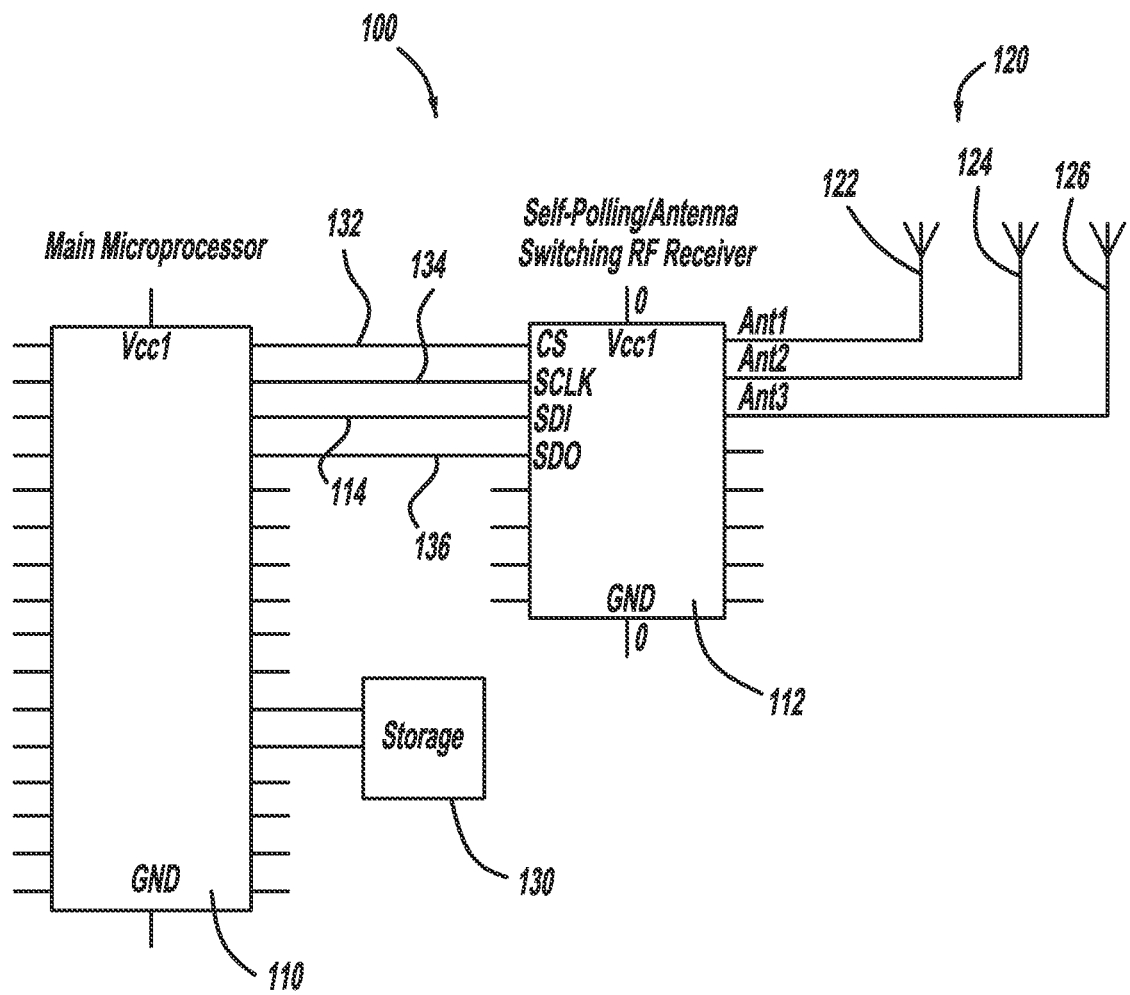
FIG. 1 is a schematic view of a system for antenna switching.

Now referring to FIG. 1, a system 100 for antenna switching is provided. The system 100 may include a micro-processor 110, a receiver 112, and a plurality of antennas 120. A micro-processor 110 may include onboard memory and may also be connected to a storage device 130 such as a memory device for example, random access memory, read only memory, static memory, or may even be a hard drive or optical drive, or other means of data storage. The main micro-processor 110 may be in communication with the receiver 112 through various electrical connections, for example, through a clock signal line 132, a serial communication clock 134, a serial digital input 114 and a serial digital output 136. The receiver 112 may be a self-polling receiver with antenna switching capability. Further, the receiver 112 may be configured to receive radio frequency (RF) signals from various devices within a vehicle. As such, the antennas 120 may be radio frequency antennas, although it is understood that other signals may also be received by the receiver 112 through the antennas 120.

In one example, a first antenna 122, a second antenna 124, and a third antenna 126 are connected to the receiver 112. However, it is understood that multiple additional antennas or fewer antennas may be connected to the receiver 112 and processed in the same manner as antennas 122, 124 and 126. As stated above, the receiver 112 may be a self-polling receiver that accepts part of its configuration from the micro-processor 110. The receiver 112 may also be configured to toggle a power output for each external antenna to activate or deactivate the antenna. These parameters may be communicated to the receiver 112 along with other configuration data through a serial communication interface over the serial digital input line 114.

As RF systems become more complex, the use of multiple antennas to receive different signals is becoming more attractive. For example, three different antennas might be required to optimize the reception of remote keyless entry, remote start, and tire pressure monitoring signals. It may also be required to coordinate powering these antennas when the particular signal is being polled. Although current self polling receivers have the capability to autonomously wake up the definitive receiver to self poll for particular RF signals, they are unable to perform switching and/or powering of multiple antennas. As a result, a main micro-processor may be used for this type of switching to reduce or eliminate the reduction in processor load and power consumption of the self-polling receiver.

Figure 2:
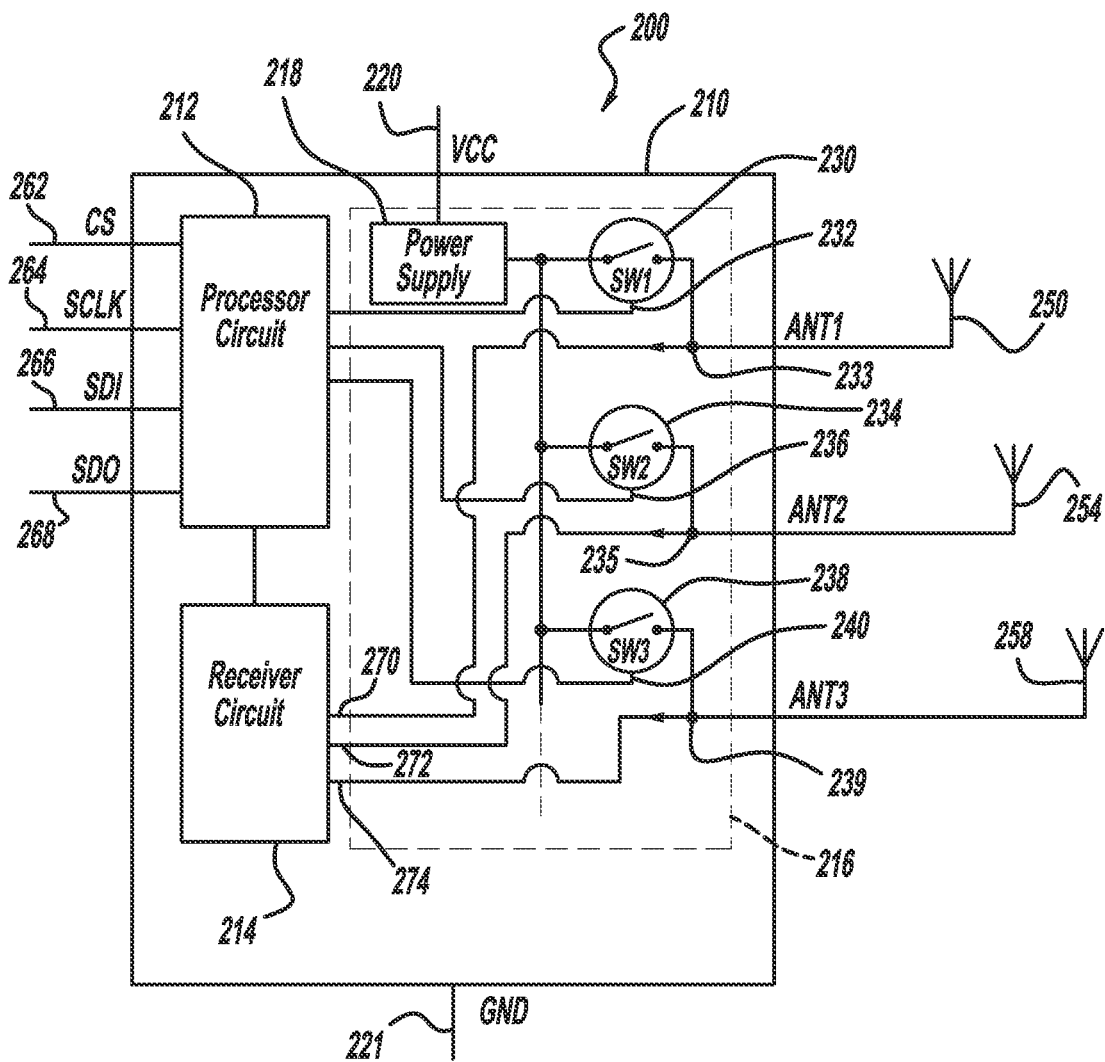
FIG. 2 is a schematic view of an intelligent receiver for antenna switching.

Now referring to FIG. 2, one implementation of the receiver 112 is provided as denoted by reference numeral 200. The intelligent receiver 200 may preferably be an application specific integrated circuit (ASIC), but may also be implemented with a field programmable gate array (FPGA) or other processor. The receiver 200 may include a processor circuit 212, a receiver circuit 214, and a power switching circuit 216. The processor circuit 212, the receiver circuit 214, and the power switching circuit 216 may all be included on a single chip and may all be housed within a single integrated circuit package 210. However, in some implementations it is understood that the power switching circuit 216 or portions thereof may be implemented external to the integrated circuit package 210, for example, using discrete components or other integrated circuits.

The processor circuit 212 may be in communication with external devices such as a telematics controller or other controller which may, for example, include a main processor as illustrated by reference number 110 in FIG. 1. As such, the processing circuit 212 of the receiver 200 may receive a clock signal 262, a serial communication clock signal 264, and a serial digital input signal 266. In addition, the processor circuit 212 may communicate information over a serial digital output signal, as denoted by reference numeral 268. The processor circuit 212 may be in communication with the receiver circuit 214, as well as, the power switching circuit 216. For example, the processor circuit 212 may be in communication with a plurality of switches 230, 234, 238 to control the providing of power to a plurality of antennas 250, 254, 258. In addition, the receiver circuit 214 may be in communication with the power switching circuit 216 to receive communication signals from the plurality of antennas 250, 254, 258.

The power input 220 of the receiver 200 may be connected to a power supply 218 of the power switching circuit 216. Similarly, a ground input 221 may be provided to the receive 200 and connected to the power circuit 216, and/or other circuits as appropriate. The power supply 218 may provide a power signal, which may power one or more of the plurality of antennas 250, 254, 258. The power signal from the power supply 218 is selectively provided to each of the plurality of antennas through the plurality of switches 230, 234, 238.

More specifically, the power signal may be provided to antenna 250 through switch 230. The processor circuit 212 may selectively connect the power supply 218 to the antenna 250 based on the switch input 232 connected to the processor circuit 212. In addition, the receiver 214 may have an antenna input 270 that is connected to the antenna 250 at node 233.

Additionally, the power signal may be provided to antenna 254 through switch 234. The processor circuit 212 may selectively connect the power supply 218 to the antenna 254 based on the switch input 236 connected to the processor circuit 212. In addition, the receiver 214 may have an antenna input 272 that is connected to the antenna 254 at node 235.

The power signal may also be provided to antenna 258 through switch 238. The processor circuit 212 may selectively connect the power supply 218 to the antenna 258 based on the switch input 240 connected to the processor circuit 212. In addition, the receiver 214 may have an antenna input 274 that is connected to the antenna 258 at node 239.

When the receiver 200 is configured to poll the antenna inputs of the integrated circuit housing 210, the corresponding switch is closed which may provide power to only that corresponding external antenna. In addition, the switches may be controlled automatically by the processor circuit 212 based on a receiver configuration which may be stored in a memory of the processor circuit 212 and/or provided to the processor circuit 212 over an input such as the serial digital input 266.

In one implementation, the receiver 200 may receive a packet which may, for example, include a byte where each bit of the byte corresponds to a respective antenna configuration. If the bit corresponding to an antenna is a 1, then the antenna may be powered by the power switching circuit 216. Alternatively, if the bit corresponding to the antenna is a 0, the power switching circuit will not power the antenna. In this scenario, the configuration may be changed based on an operating mode of the system. For example in a vehicle application, the receiver configuration may be set to disable powering of certain antennas based on certain use conditions. For example, certain antennas may have less need to poll a signal if the vehicle has not been in use for a long period of time. In some implementations, certain antennas, such as the tire pressure sensor antennas may be polled with significantly less frequency if the vehicle has not been in use in a predefined time period, such as more than a month. However, the polling frequency can be again modified when the vehicle is started by changing the configuration stored in the intelligent receiver, for example over the serial digital input.

Figure 3:
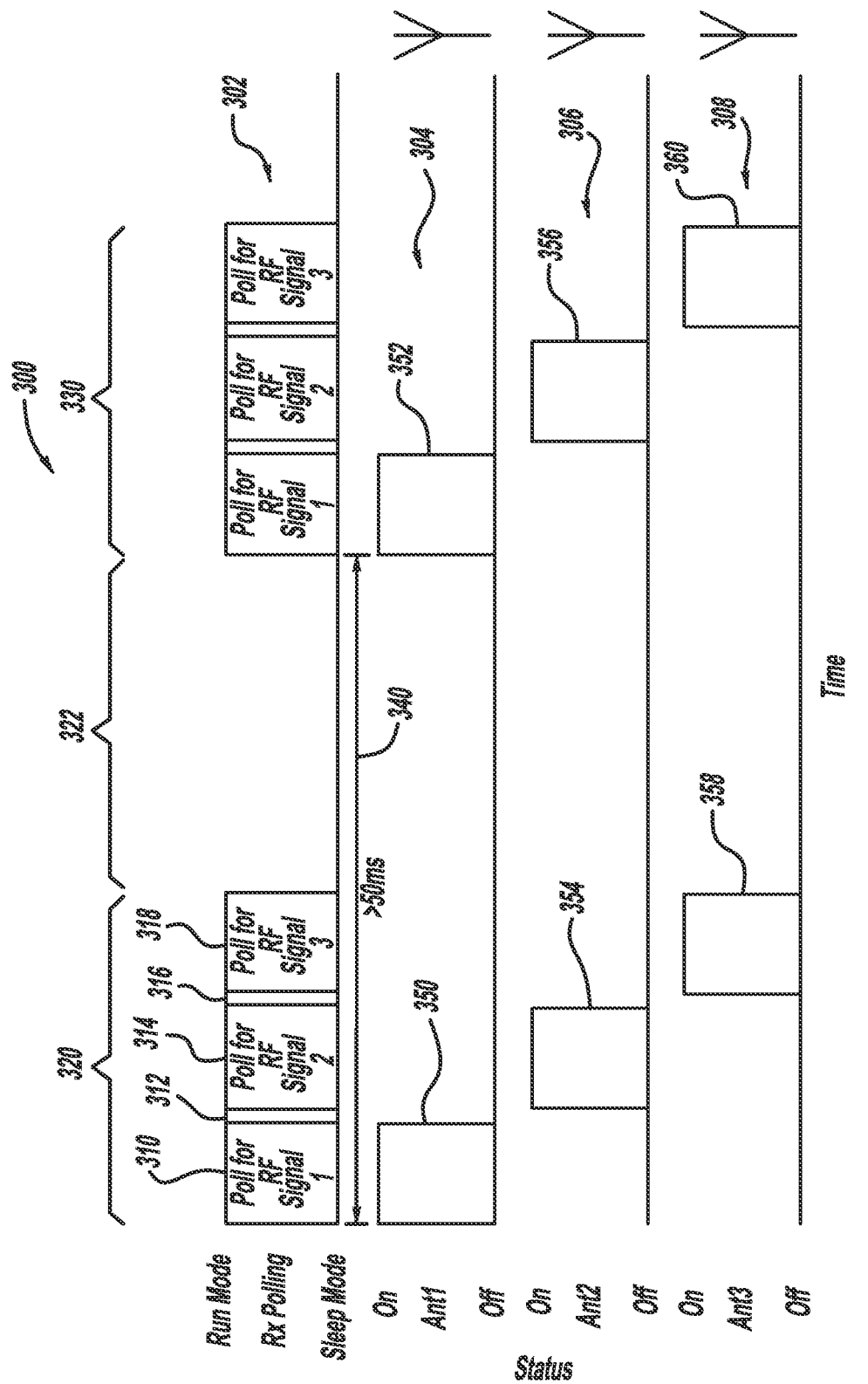
FIG. 3 is a timing diagram for an intelligent receiver.

Now referring to FIG. 3, a timing diagram for the polling and/or powering of the antennas is provided. Line 302 illustrates the receiver polling between run mode and sleep mode. The sleep mode may require significantly less power than the run mode. Line 304 illustrates the antenna power on and power off modes for antenna one. Line 306 illustrates the power on and power off modes for antenna two and line 308 illustrates the power on and power off modes for antenna three. The receiver may poll in cycles with periods of activity 320 where the receiver is in run mode followed by periods of inactivity 322 where the receiver is in sleep mode. The cycle may be continuous, for example, with additional periods of activity and inactivity, as denoted by period 330. During a period of activity 320, the receiver may poll for a first signal, as denoted by reference numeral 310. As such, the receiver may receive an RF signal over a first antenna during period 310. In addition, the first antenna may be powered on during the corresponding time period, as denoted by period 350 of line 304. During time period 312, the receiver may be reconfigured to poll for the second RF signal. For example, the first RF signal may be a remote keyless entry signal which is received through the first antenna, then the second RF signal, such as, a tire pressure monitor signal may be is received through a second antenna. The receiver may poll for the second RF signal, as denoted by period 314. Also the second antenna associated with the second signal may be powered on during a corresponding time period, as denoted by period 354 of line 306.

During time period 316, the receiver may reconfigure to poll for the third RF signal. Thereafter, the receiver may poll for the third RF signal (e.g., a remote start signal) as denoted by time period 318. Further, the third antenna may be powered on, as denoted by period 358 of line 308 to correspond with the receiver polling 318. While the three polling periods 310, 314, 318 are shown for this implementation, it is understood that additional polling time periods may be provided for additional signals. In addition, it is understood that multiple signals could be polled using the same antenna or multiple antennas may be polled for a particular signal based on the stored configuration data. As such, various combinations of receiver polling for a particular antenna and antenna power on scenarios may be used together for various configurations.

After the RF signals are polled, a sleep mode may be entered by the polling receiver for a period of inactivity 322. The receiver may be powered down or configured such that a lower power usage is required during this time period by various components of the receiver (e.g., the processor circuit, the receiver circuit, or the power switching circuit). However, an activity period 330 may follow the inactivity period 322 creating alternating cycles of activity periods and inactivity periods. However, the time between the start of one activity period and the start of the next activity period (e.g., 320, 330) may be less than a predetermined amount of time, as denoted by arrow 340. For example, the time period between activity starts may be less than 50 milliseconds such that a remote keyless entry system may receive the RF signal from the remote keyless entry transmitter. In a typical remote keyless entry implementation, the transmitter will transmit a signal for a time period of approximately 50 milliseconds. As such, the receiver will receive the remote keyless entry signal at least once during the 50 millisecond time period. As described above, the receiver may autonomously supply power to the antenna used to receive the RF signal that is being polled.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions.

The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of the invention. This description is not intended to limit the scope or application of the invention in that the invention is susceptible to modification, variation and change, without departing from spirit of the invention, as defined in the following claims.

What is claimed is:

1. A system for receiving signals with antenna switching capability, the system comprising:
    a plurality of antennas configured to receive the signals;
    a receiver in communication with each antenna of the plurality of antennas, the receiver comprising:
        a processing circuit configured to receive configuration information and generate control signals based on the configuration information,
        a receiver circuit configured to process the signals, the receiver circuit in communication with the plurality of antennas, and
        a power switching circuit configured to power each antenna of the plurality of antennas, the power switching circuit comprising a plurality of switches configured to provide power from a power supply to each antenna of a set of the plurality of antennas based on the control signals from the processing circuit; and
    a micro-processor, not comprised in the receiver, in communication with the receiver, the micro-processor configured to provide the configuration information indicating the set of the plurality of antennas to sequentially power and poll to receive and process the signals therefrom, wherein the configuration information is based on a duration of non-use of a vehicle comprising the system and not derived from signals received by at least one of the plurality of antennas.

2. The system according to claim 1, wherein the processing circuit is in communication with the receiver circuit for coordinating polling of the receiver with powering of each antenna of the set of the plurality of antennas.

3. The system according to claim 1, wherein the receiver circuit is configured to sequentially poll each antenna of the set of the plurality of antennas during a period of activity.

4. The system according to claim 1, wherein the power switching circuit is configured to power each antenna of the set of the plurality of antennas while being polled by the receiver and remove power from the set of the plurality of antennas when not being polled by the receiver.

5. The system according to claim 1, wherein the processing circuit is configured to store configuration information indicating the set of the plurality of antennas to power and poll based on a vehicle status.

6. The system according to claim 1, wherein the processing circuit is configured to receive configuration information over a serial input indicating the set of the plurality of antennas to power and poll based on a vehicle status.

7. The system according to claim 1, wherein the signals comprise at least one of a remote keyless entry, a tire pressure monitor, and a remote start signals.

8. A receiver for processing signals from a plurality of antennas configured to receive the signals, the receiver having antenna switching capability, the receiver comprising:
    a processing circuit configured to receive configuration information from a micro-processor and to generate control signals based on the configuration information, the micro-processor not comprised in the receiver, the processing circuit further configured to coordinate via communication a sequential polling of a set of the plurality of antennas with powering of each antenna of the set of the plurality of antennas to receive and process the signals therefrom, wherein the configuration information is based on a duration of non-use of a vehicle comprising the receiver and not derived from signals received by at least one of the plurality of antennas;
    a receiver circuit configured to communicate with the plurality of antennas and to process the signals; and
    a power switching circuit configured to power each antenna of the plurality of antennas, the power switching circuit comprising a plurality of switches configured to provide power from a power supply to each antenna of the set of the plurality of antennas based on the control signals from the processing circuit.

9. The system according to claim 8, wherein the processing circuit is in communication with the receiver circuit for coordinating polling of each antenna of the set of the plurality of antennas by the receiver with powering of each antenna of the plurality of antennas.

10. The receiver according to claim 8, wherein the processing circuit, the receiver circuit, and the power switching circuit are formed on a chip and housed within an integrated circuit housing.

11. The receiver according to claim 8, wherein processing circuit is configured to provide alternating periods of activity where the receiver is in a run mode and inactivity where the receiver is in a sleep mode, and wherein time between the start of one activity period and start of another activity period is configured to vary about a predetermined amount of time.

12. The receiver according to claim 8, wherein the receiver circuit is configured to sequentially poll each antenna of the set of the plurality of antennas during the period of activity.

13. The receiver according to claim 8, wherein the power switching circuit is configured to power each antenna of the set of the plurality of antennas while being polled by the receiver and remove power from the set of the plurality of antennas when not being polled by the receiver.

14. The receiver according to claim 8, wherein the processing circuit is configured to store configuration information indicating the set of the plurality of antennas to power and poll based on a vehicle status.

15. The receiver according to claim 8, wherein the processing circuit is configured to receive configuration information over a serial input indicating the set of the plurality of antennas to power and poll based on a vehicle status.

16. A method for receiving signals using a receiver with antenna switching capability, the method comprising:
    receiving from a micro-processor configuration data at the receiver, the micro-processor not comprised in the receiver, the configuration data indicating a set of a plurality of antennas to power and poll to receive and process the signals therefrom, the plurality of antennas configured to receive the signals, wherein the configuration data is based on a duration of non-use of a vehicle comprising the receiver and not derived from signals received by at least one of the plurality of antennas;
    generating control signals based on the configuration data;
    powering, by a power supply, each antenna of the set of the plurality of antennas based on the control signals;
    polling each antenna of the set of the plurality of antennas; and
    receiving and processing the signals from each polled antenna.

17. The method according to claim 16, further comprising alternating periods of activity where the receiver is in a run mode and inactivity where the receiver is in a sleep mode, and wherein time between the start of one activity period and start of another activity period is configured to vary about a predetermined amount of time.

18. The method according to claim 16, further comprising sequentially polling each antenna of the set of the plurality of antennas during the period of activity.

19. The method according to claim 16, further comprising powering each antenna of the set of the plurality of antennas while being polled by the receiver and removing power from each antenna of the set of the plurality of antennas when not being polled by the receiver.

20. In a non-transitory computer readable storage medium having stored therein instructions executable by a programmed processor for receiving signals using a receiver with antenna switching capability, the non-transitory storage medium comprising instructions for:

receiving from a micro-processor configuration data at the receiver, the micro-processor not comprised in the receiver, the configuration data indicating a set of a plurality of antennas to power and poll to receive and process the signals therefrom, the plurality of antennas configured to receive the signals, wherein the configuration data is based on a duration of non-use of a vehicle comprising the receiver and not derived from signals received by at least one of the plurality of antennas;

generating control signals based on the configuration data;

sequentially powering, by a power supply, each antenna of the set of the plurality of antennas based on the control signals;

polling each antenna of the set of the plurality of antennas; and receiving and processing the signals from each polled antenna.

21. The non-transitory computer readable storage medium according to claim 20, further comprising instructions for alternating periods of activity where the receiver is in a run mode and inactivity where the receiver is in a sleep mode, and wherein time between the start of one activity period and start of another activity period is configured to vary about a predetermined amount of time.

22. The non-transitory computer readable storage medium according to claim 20, further comprising instructions for sequentially polling each antenna of the set of the plurality of antennas during the period of activity.

23. The non-transitory computer readable storage medium according to claim 20, further comprising instructions for powering each antenna of the set of the plurality of antennas while being polled by the receiver and removing power from each antenna of the set of the plurality of antennas when not being polled by the receiver.

* * * * *